(12) United States Patent
Giannakis et al.

(10) Patent No.: US 7,224,744 B2
(45) Date of Patent: May 29, 2007

(54) SPACE-TIME MULTIPATH CODING SCHEMES FOR WIRELESS COMMUNICATION SYSTEMS

(75) Inventors: Georgios B. Giannakis, Minnetonka, MN (US); Xiaoli Ma, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 792 days.

(21) Appl. No.: 10/420,352

(22) Filed: Apr. 21, 2003

(65) Prior Publication Data

US 2004/0013180 A1 Jan. 22, 2004

Related U.S. Application Data

(60) Provisional application No. 60/374,981, filed on Apr. 22, 2002, provisional application No. 60/374,935, filed on Apr. 22, 2002, provisional application No. 60/374,934, filed on Apr. 22, 2002, provisional application No. 60/374,933, filed on Apr. 22, 2002, provisional application No. 60/374,886, filed on Apr. 22, 2002.

(51) Int. Cl.
*H04B 7/02* (2006.01)
(52) U.S. Cl. ..................................... 375/267
(58) Field of Classification Search ........ 375/260–262, 375/265, 267, 299; 370/320, 342
See application file for complete search history.

(56) References Cited

U.S. PATENT DOCUMENTS 6,188,717 B1    2/2001    Kaiser et al.
6,473,467 B1 *  10/2002   Wallace et al. ............. 375/267
6,865,237 B1 *  3/2005    Boariu et al. ............... 375/295
6,891,897 B1 *  5/2005    Bevan et al. ............... 375/265
6,898,248 B1    5/2005    Elgamal et al.
2002/0167962 A1 11/2002   Kowalski
2004/0146014 A1 * 7/2004  Hammons et al. .......... 370/320

OTHER PUBLICATIONS

A. Aggarwal, S. Savage, and T. Anderson, "Understanding the Performance of TCP Pacing," in Proc. Of IEEE Infocom 00, Tel-Aviv, Israel, Mar. 2000.

D. Agrawal, V. Tarokh, A. Naguib, and N. Seshadri, "Space-Time Coded OFDM for High Data-Rate Wireless Communication Over Wideband Channels," Proc. Of Vehicular Technology Conf., pp. 2232-2236, Ottawa, Ont, Canada, May 18-21, 1998.

N. Al-Dhahir, "Single-Carrier Frequency-Domain Equalization for Space-Time Block-Coded Transmissions over Frequency-Selective Fading Channels," IEEE Communications Letters, vol. 5, No. 7, pp. 304-306, Jul. 2001.

N. Al-Dhahir and A.H. Sayed, "The Finite-Length Multi-Input Multi-Output MMSE-DFE," IEEE Trans. On Signal Processing, vol. 48, No. 10, pp. 1-38, Oct. 2000.

(Continued)

*Primary Examiner*—Don N. Vo
(74) *Attorney, Agent, or Firm*—Shumaker & Sieffert, P.A.

(57) ABSTRACT

Space-time multipath (STM) coding techniques are described for frequency-selective channels, respectively. The described STM coded system guarantees full space-multipath diversity, and achieves large coding gains with high bandwidth efficiency. The techniques utilize a linearly coding technique, and incorporates subchannel grouping for application of the linear coding techniques. As a result, the techniques enable desirable tradeoffs between performance and complexity.

35 Claims, 10 Drawing Sheets

OTHER PUBLICATIONS

S.L. Ariyavistakul, "Turbo Space-Time Processing to Improve Wireless Channel Capacity," IEEE Trans. On Communications, vol. 48, No. 8, pp. 1347-1359, Aug. 2000.

S. Barbarossa and F. Cerquetti, "Simple Space-Time Coded SS-CDMA Systems Capable of Perfect MUI/ISI Elimination," IEEE Communications Letters, vol. 5, No. 12, pp. 471-473, Dec. 2001.

S. Benedetto, G. Montorsi, D. Divsalar, and F. Pollara, "A Soft-Input Soft-Output Maximum A Posterior (MAP) Module to Decode Parallel and Serial Concatenated Codes," TDA Progress Report, vol. 42-127, Nov. 15, 1996, downloadable from http://tmo.jpl.nasa.gov/tmo/progress_report/index.html.

C. Berrou, A. Glavieux, and P. Thitimajsima, "Near Shannon Limit Error-Correcting Coding and Decoding: Turbo Codes (1)," in Proc. Of Intl. Conf. On Com., Geneva, Switzerland, May 1993, pp. 1064-1070.

S. Bhashyam, A.M. Sayeed, and B. Aazhang, "Time-Selective Signaling and Reception for Communication over Multipath Fading Channels," IEEE Trans. On Communications, vol. 48, No. 1, pp. 1-34, Jan. 2000.

E. Biglieri, J. Proakis, and S. Shamai, "Fading Channels: Information-Theoretic and Communications Aspects," IEEE Trans. On Information Theory, vol. 44, No. 6, pp. 2619-2692, Oct. 1998.

J. Boutros and E. Viterbo, "Signal Space Diversity: A Power-and Bandwidth-Efficient Diversity Technique for the Rayleigh Fading Channel," IEEE Transactions on Information Theory, vol. 44, No. 4, pp. 1453-1467, Jul. 1998.

H. Bolcskei and A.J. Paulraj, "Space-Frequency Codes for Broadband Fading Channels," in Proc. of IEEE Int. Symposium on Information Theory, pp. 219, Washington D.C., Jun. 24-29, 2001.

H. Bolcskei and A.J. Paulraj, "Space-Frequency Coded Broadband OFDM Systems," in Proc. of Wireless Communications and Networking Conference, vol. 1, pp. 1-6, Chicago, IL, Sep. 23-28, 2000.

D.K. Borah and B. Hart, "Receiver Structures for Time-Varying Frequency-Selective Fading Channels," IEEE Journal on Selected Areas in Communications, vol. 17, No. 11, pp. 1863-1875, Nov. 1999.

J.K. Cavers, "Optimized Use Of Diversity Modes In Transmitter Diversity Systems," in Proc. of the Vehicular Technology Conf., vol. 3, Amsterdam, The Netherlands, 1999, pp. 1768-1773.

D. Dardari and V. Tralli, "High-Speed Indoor Wireless Communications at 60 GHz with Coded OFDM," IEEE Transactions on Communications, vol. 47, No. 11, pp. 1709-1721, Nov. 1999.

V.M. DaSilva and E. S. Sousa, "Fading-Resistant Modulation Using Several Transmitter Antennas," IEEE Transactions on Communications, vol. 45, No. 10, pp. 1236-1244, Oct. 1997.

A. Duel-Hallen, S. Hu, and H. Hallen, "Long-Range Prediction of Fading Signals," IEEE Signal Processing Magazine, pp. 62-75, May 2000.

S. Floyd, M. Handley, J. Padhye, and J. Widmer, "Equation-Based Congestion Control for Unicast Applications," in Proc.Of SIGCOMM'00.

G.J. Foschini and M.J. Gans, "On Limits of Wireless Communications in a Fading Environment When Using Multiple Antennas," Wireless Personal Communications, vol. 6, No. 3, pp. 311-335, Mar. 1998.

G.B. Giannakis, X. Ma, G. Leus, and S. Zhou, "Space-Time-Doppler Coding Over Time-Selective Fading Channels With Maximum Diversity And Coding Gains," Proc. Of Intl. Conf. On ASSP, Orlando, FL, May 13-17, 2002, pp. III-2217-III-2220.

G.B. Giannakis and S. Zhou, "Optimal Transmit-Diversity Precoders for Random Fading Channels," in Proc. of Globecom Conf., vol. 3, San Francisco, CA, Nov. 27-Dec. 1, 2000.

G.B. Giannakis and C. Tepedelenlioglu, "Basis Expansion Models and Diversity Techniques for Blind Identification and Equalization of Time-Varying Channels," Proceedings of the IEEE, vol. 86, No. 10,pp. 1969-1986, Oct. 1998.

X. Giraud, E. Boutillon, and J.C. Belfiore, "Algebraic Tools to Build Modulation Schemes for Fading Channels," IEEE Transactions on Information Theory, vol. 43, pp. 938-952, May 1997.

D. Gore, S. Sandhu, and A. Paulraj, "Delay Diversity Code for Frequency Selective Channels," Electronics Letters, vol. 37, No. 20, pp. 1230-1231, Sep. 27, 2001.

J. Hagenauer, and P. Hoeher, "A Viterbi Algorithm with Soft-Decision Outputs and Its Applications," in Proc. Of the IEEE 1989 Global Communications Conference, Dallas, Texas, pp. 1680-1686, Nov. 1989.

B. Hassibi and B.M. Hochwald, "High-Rate Codes that are Linear in Space and Time," IEEE Trans. On Information Theory, pp. 1-56, revised Apr. 2001; URL: http://mars.bell-labs.com/cm/ms/what/mars/index.html.

A. Hiroike, F. Adachi, and N. Nakajima, "Combined Effects of Phase Sweeping Transmitter Diversity and Channel Coding," IEEE Trans. On Vehicular Technology, pp. 170-176, May 1992.

R. Hoshyar, S.H. Jamali, and A.R.S. Bahai, "Turbo Coding Performance in OFDM Packet Transmissions," in Proc. IEEE VTC, Tockyo, Japan, 2000, vol. 2, pp. 805-810.

S.A. Jafar, S. Vishwanath, and A. Goldsmith, "Channel Capacity and Beamforming for Multiple Transmit and Receive Antennas with Covariance Feedback," in Proc. of International Conference on Communications, vol. 7, Helsinki, Finland, Jun. 2001.

G. Jongren, M. Skoglund, and B. Ottersten, "Combining Transmit Beamforming and Orthogonal Space-Time Block Codes by Utilizing Side Information," IEEE Sensor Array and Multichannel Signal Processing Workshop, Mar. 14, 2000.

G. Jongren, M. Skoglund, and B. Ottersten, "Combining Transmit Antenna Weights and Orthogonal Space-Time Block Codes by Utilizing Side Information," In Proceedings of the $33^{rd}$ Asilomar Conference on Signals, Systems and Computers, Oct. 23, 1999.

G. Jongren and M. Skoglund, "Utilizing Quantized Feedback Information in Orthogonal Space-Time Block Coding," in Proceedings IEEE Global Telecommunications Conference, Nov. 27, 2000.

G. Kaplan and S. Shamai, "Achievable Performance Over the Correlated Rician Channel," IEEE Transactions on Communications, vol. 42, No. 11, pp. 2967-2978, Nov. 1994.

W.-Y. Kuo and M.P. Fitz, "Design and Analysis of Transmitter Diversity Using Intentional Frequency Offset for Wireless Communications," IEEE Trans. On Vehicular Technology, vol. 46, No. 4, pp. 871-881, Nov. 1997.

B. Le Floch, M. Alard, and C. Berrou, "Coded Orthogonal Frequency Division Multiplex," Proceedings of the IEEE, vol. 83, No. 6, pp. 982-996, Jun. 1995.

G. Leus, S. Zhou, and G.B. Giannakis, "Multi-User Spreading Codes Retaining Orthagonality through Unknown Time- and Frequency-Selective Fading," Proc. Of GLOBECOM, vol. 1, pp. 259-263, San Antonio, TX, Nov. 25-29, 2001.

Y. Li, "Simplified Channel Estimation for OFDM Systems With Multiple Transmit Antennas," IEEE Transactions On Wireless Communications, vol. 1, No. 1, pp. 67-75, Jan. 2002.

E. Lindskog and A. Paulraj, "A Transmit Diversity Scheme for Channels with Intersymbol Interference," Proceedings Of International Conference On Comm., vol. 1, pp. 307-311, Jun. 2000.

Y. Liu, M. P. Fitz, and O. Y. Takeshita, "Space-Time Codes Performance Criteria and Design for Frequency Selective Fading Channels," Proc. Of International Conference on Comm., Helsinki, Finland, Jun. 11-15, 2001.

Z. Liu, Y. Xin, and G.B. Giannakis, "Linear Constellation Precoding for OFDMW With Maximum Multipath Diversity and Coding Gains," IEEE Transactions On Communications, vol. 51, No. 3, pp. 416-427, Mar. 2003.

Z. Liu, Y. Xin, and G.B. Giannakis, "Space-Time-Frequency Coded OFDM Over Frequency-Selective Fading Channels," IEEE Transactions on Signal Processing, vol. 50, No. 10, pp. 2465-2476, Oct. 2002.

Z. Liu, Y. Xin, and G.B. Giannakis, "Space-Time-Frequency Trellis Coding for Frequency-Selective Fading Channels", pp. 145-149, 2002.

Z. Liu, Y. Xin, and G.B. Giannakis, "Space-Time-Frequency Block Coded OFDM with Subcarrier Grouping and Constellation Precoding," Proc. Of Intl. Conf. on ASSP, Orlando, FL, May 13-17, 2003, pp. III-2205-III-2208.

B. Lu and X. Wang, "Space-Time Code Design in OFDM Systems," Proc. Of Global Telecommunications Conferences, San Francisco, CA, vol. 2, pp. 1000-1004, Nov. 27-Dec. 1, 2000.

X. Ma and G.B. Giannakis, "Space-Time Coding for Doubly-Selective Channels," Proc. Of Intl. Conf. On Circuits and Systems, Scottsdale, AZ, May 25-29, 2002, pp. III-647-III-650.

X. Ma and G.B. Giannakis, "Maximum-Diversity Transmissions over Time-Selective Wireless Channels," Proc. of Wireless Communications and Networking Conf., Orlando, FL, Mar. 17-21, 2002, pp. 497-501.

X. Ma and G.B. Giannakis, "Maximum-Diversity Transmissions Over Doubly Selective Wireless Channels," IEEE Transactions On Information Theory, vol. 49, No. 7, pp. 1832-1840, Jul. 2003.

X. Ma, C. Tepedelenlioglu, G.B. Giannakis, and S. Barbarossa, "Non-Data-Aided Carrier Offset Estimators for OFDM With Null Subcarriers: Identifiability, Algorithms, and Performance," IEEE Journal on Selected Areas in Communications, vol. 19, No. 12, pp. 2504-2515, Dec. 2001.

J. Mahdavi and S. Floyd, "TCP-Friendly Unicast Rate-Based Flow Control," Jan. 1997, http://www.psc.edu/networking/papers/tcp_friendly.html.

M. Martone, "Wavelet-Based Separating Kernels for Sequence Estimation with Unknown Rapidly Time-Varying Channels," IEEE Communications Letters, vol. 3, No. 3, pp. 78-80, Mar. 1999.

M. Mathis, J. Semke, J. Mahdavi, and T. Ott, "The Macroscopic Behavior of the TCP Congestion Avoidance Algorithm," Computer Communication Review, Vo. 27 No. 3, Jul. 1997, pp. 1-16.

B. Muquet, M. de Courville, G.B. Giannakis, Z. Wang, and P. Duhamel, "Reduced Complexity Equalizers For Zero-Padded OFDM Transmissions".

A.F. Naguib, "On The Matched Filter Bound of Transmit Diversity Techniques," IEEE International Conference on Communications, vol. 2, pp. 596-603, Helsinki, Finland, Jun. 11-14, 2001.

A. Narula, M.J. Lopez, M.D. Trott, and G.W. Wornell, "Efficient Use of Side Information in Multiple-Antenna Data Transmission over Fading Channels," IEEE Journal on Selected Areas In Communications, vol. 16, No. 8, pp. 1423-1436, Oct. 1998.

A. Narula, M.D. Trott, and G.W. Wornell, "Performance Limits of Coded Diversity Methods for Transmitter Antenna Arrays," IEEE Transactions On Information Theory, vol. 45, No. 7, pp. 2418-2433, Nov. 1999.

S. Ohno and G.B. Giannakis, "Optimal Training and Redundant Precoding for Block Transmissions With Application to Wireless OFDM," IEEE Transaction on Communications, vol. 50, No. 12, pp. 2113-2123, Dec. 2002.

M.F. Pop and N.C. Beaulieu, "Limitations of Sum-of-Sinusoids Fading Channel Simulators," IEEE Transactions On Communications, vol. 49, No. 4, pp. 699-708, Apr. 2001.

R. Rajaie, H. Yu, M. Handely, and D. Estrin, "Multimedia Proxy Caching Mechanism for Quality Adaptive Streaming Applications in the Internet," Technical report 99-709, Computer Science Department, USC.

R. Rajaie, M. Handely, and D. Estrin, "Quality Adapation for Congestion Controlled Video Playback over the Internet," in Proc of SIGCOMM'99, pp. 1-16.

S. Sen, J. Rexford, and D. Towsley, "Proxy Prefix Caching for Multimedia Streams," in Proc. of IEEE INFOCOM'99.

L. Rizzo, IP Dummynet, pp. 1-9, http://info.iet.unipi.it/luigi/ip_dummynet/.

O. Rose, "Statistical Properties of MPEG Video Traffic and Their Impact on Traffic Modeling in ATM Network," TR-101, Institute of Computer Science, University of Wurzburg, Germany, Feb. 1995, pp. 1-25.

M. Rouanne and D.J. Costello, Jr., "An Algorithm for Computing the Distance Spectrum of Trellis Codes," IEEE Journal on Selected Areas in Communications, vols. 7, No. 6, pp. 929-940, Aug. 1989.

A. Ruiz, J.M. Cioffi, and S. Kasturia, "Discrete Multiple Tone Modulation with Coset Coding for the Spectrally Shaped Channel," IEEE Transactions on Communications, vol. 40, No. 6, pp. 1012-1029, Jun. 1992.

H.R. Sadjadpour, "Application of Turbo Codes for Discrete Multi-Tone Modulation Schemes," in Proc. Of Intl. Conf. On Com., Vancouver, Canada, 1999, vol. 2, pp. 1022-1027.

A.M. Sayeed and B. Aazhang, "Joint Multipath-Doppler Diversity in Mobile Wireless Communications," IEEE Transactions On Communications, vol. 47, No. 1, pp. 123-132, Jan. 1999.

D.-S. Shiu, G.J. Foschini, M.J. Gans, and J.M. Kahn, "Fading Correlation and Its Effect on the Capacity of Multielement Antenna Systems," IEEE Transactions on Communications, vol. 48, No. 3, pp. 502-513, Mar. 2000.

A. Stamoulis, G.B. Giannakis, and A. Scaglione, "Block FIR Decision-Feedback Equalizers for Filterbank Precoded Transmissions with Blind Channel Estimation Capabilities," IEEE Transactions On Communications, vol. 49, No. 1, pp. 69-83, Jan. 2001.

L. Sylla, P. Fortier, and H.T. Huynh, "Performance of COFDM Using Turbo Codes," in Proc. Of IEEE Canadian Conference on Electrical and Computer Engineering, Edmonton, Alta, Canada, May 9-12, 1999.

V. Tarokh, H. Jafarkhani, and A.R. Calderbank, "Space-Time Block Codes from Orthogonal Designs," IEEE Transactions On Information Theory, vol. 45, No. 5, pp. 1456-1467, Jul. 1999.

C. Tepedelenlioglu and G.B. Giannakis, "Transmitter Redundancy for Blind Estimation and Equalization of Time- Frequency-Selective Channels," IEEE Transactions On Signal Processing, vol. 48, No. 7, pp. 2029-2043, Jul. 2000.

M.K. Tsatsanis and G.B. Giannakis, "Modelling and Equalization of Rapidly Fading Channels," International Journal of Adaptive Control and Signal Processing, vol. 10, pp. 159-176, 1996.

E. Visotsky and U. Madhow, "Space-Time Transmit Precoding With Imperfect Feedback," IEEE Transactions on Information Theory, vol. 47, No. 6, pp. 2632-2639, Sep. 2001.

A.J. Viterbi, "An Intuitive Justification and a Simplified Implementation of the MAP Decoder for Convolutional Codes," IEEE Journal on Selected Areas in Communications, vol. 16, No. 2, pp. 260-264, Feb. 1998.

E. Viterbo, and J. Boutros, "A Universal Lattice Code Decoder for Fading Channels," IEEE Transactions on Information Theory, vol. 45, no. pp. 1639-1642, Jul. 1999.

J. Vogt, K. Koora, A. Finger, and G. Fettweis, "Comparison of Different Turbo Decoder Realizations For IMT-2000," in Global Telecommunications Conference—GLOBECOM'99, Rio de Janeiro, Brazil, 1999, vol. 5, pp. 2704-2708.

F.W. Vook and T.A. Thomas, "Transmit Diversity Schemes for Broadband Mobile Communication Systems," Proc. Of Vehicular Tech. Conf., vol. 6, pp. 2523-2529, Boston MA, Sep. 24-28, 2000.

H. Wang, J. Belzile, and C.L. Despins, "64-QAM OFDM With TCM Coding and Waveform Shaping In A Time-Selective Rician Facing Channel," in Proc. Of Int'l Zurich Seminar on Broadband Comm., Berdun, Que., Canada, 2000, pp. 257-261.

X. Wang and H.V. Poor, "Iterative (Turbo) Soft Interface Cancellation and Decoding for Coded CDMA," IEEE Transactions on Communications, vol. 47, No. 7, pp. 1046-1061, Jul. 1999.

Y. Wang, Z.-L. Zhang, D. Du, and D. Su, "A Network-Conscious Approach to End-to-End Video Delivery Over Wide Area Networks Using Proxy Servers," in Proceedings of IEEE INFOCOM'98.

Z. Wang, S. Zhou, and G.B. Giannakis, "Joint Coding-Precoding with Low Complexity Turbo-Decoding," IEEE Transactions on Wireless Communications, vol. XXX, No. XXX, pp. 1-11, Month 2003; also in Proc. Of the European Wireless Conference, Florence, Italy, Feb. 25-28.

Z. Wang and G.B. Giannakis, "Lineraly Precoded or Coded OFDM against Wireless Channel Fades?" in Third IEEE Signal Processing Workshop on Signal Processing Advances in Wireless Communication, Taoyuan, Taiwan, Mar. 20-23, 2001.

Z. Wang and G.B. Giannakis, "Complex-Field Coding for OFDM Over Fading Wireless Channels" IEEE Transactions on Information Theory, vol. 49, No. 3, pp. 707-720, Mar. 2003.

Z. Wang and G.B. Giannakis, "Wireless Multicarrier Communications: Where Fourier Meets Shannon," IEEE Signal Processing Magazine, vol. 17, No. 3, pp. 29-48, May 2000.

A. Wittneben, "A New Bandwidth Efficient Transmit Antenna Modulation Diversity Scheme for Linear Digital Modulation," Proc. of IEEE International Conference on Comm., vol. 3, pp. 1630-1634, Geneva, Switzerland, May 23-26, 1993.

Y. Xin, Z. Wang, and G.B. Giannakis, "Space-Time Constellation-Rotating Codes Maximizing Diversity and Coding Gains," Proc. Of GLOBECOM, vol. 1, pp. 455-459, San Antonio, TX, Nov. 25-27, 2001.

Q. Yan and R.S. Blum, "Robust Space-Time Block Coding for Rapid Fading Channels," IEEE Global Telecommunications Conference, vol. 1, pp. 460-464, San Antonio, TX, Nov. 25-29, 2001.

Z.-L. Zhang, S. Nelakuditi, R. Aggarwal, and R. Tsang, "Efficient Selective Frame Discard Algorithms for Stored Video Delivery across Resource Constrained Networks," in Proc. of IEEE INFOCOM'99, pp. 1-26.

S. Zhou, G.B. Giannakis, and C. Le Martret "Chip-Interleaved Block-Spread Code Division Multiple Access," IEEE Transactions On Communications, vol. 50, No. 2, pp. 235-248, Feb. 2002.

S. Zhou and G.B. Giannakis, "Optimal Transmitter Eigen-Beamforming and Space-Time Block Coding Based on Channel Correlations," IEEE Trans. Signal processing, vol. 50, No. 10, pp. 553-557, Oct. 2002.

S. Zhou and G.B. Giannakis, "Space-Time Coding With Maximum Diversity Gains Over Frequency-Selective Fading Channels," IEEE Signal Processing Letters, vol. 8, No. 10, pp. 269-272, Oct. 2001.

S. Zhou, Z. Wang, N. Bapat, G.B. Giannakis, "Turbo Decoding of Error Control Coded and Unitary Precoded OFDM", pp. 1237-1241, University of Minnesota.

S. Zhou, B. Muquet, and G.B. Giannakis, "Subspace-Based (Semi-) Blind Channel Estimation for Block Precoded Space-Time OFDM," IEEE Transactions on Signal Processing, vol. 50, No. 5, pp. 1215-1228, May 2002.

K.R. Narayanan et al., "Low Complexity Turbo Equalization with Binary Precoding," 5 pages, IEEE, 2000.

W.W. Peterson et al., *Error-Correcting Codes*, Second Edition, MIT Press 1972, pp. 125, 129-131, 556.

G.C. Clark, Jr. et al., *Error-Correction Coding for Digital Communications*, Plenum Press, pp. 9, 10, 420.

* cited by examiner

SPACE-TIME MULTIPATH CODING SCHEMES FOR WIRELESS COMMUNICATION SYSTEMS

This application claims priority from U.S. Provisional Application Ser. No. 60/374,886, filed Apr. 22, 2002, U.S. Provisional Application Ser. No. 60/374,935, filed Apr. 22, 2002, U.S. Provisional Application Ser. No. 60/374,934, filed Apr. 22, 2002, U.S. Provisional Application Ser. No. 60/374,981, filed Apr. 22, 2002, U.S. Provisional Application Ser. No. 60/374,933, filed Apr. 22, 2002, the entire contents of which are incorporated herein by reference.

STATEMENT REGARDING FEDERALLY SPONSORED RESEARCH OR DEVELOPMENT

This invention was made with Government support under Contract No. CCR-0105612, awarded by the National Science Foundation, and Contract No. DAAD19 01-2-0011 (University of Delaware Subcontract No. 497420) awarded by the U.S. Army. The Government may have certain rights in this invention.

TECHNICAL FIELD

The invention relates to communication systems and, more particularly, transmitters and receivers for use in wireless communication systems.

BACKGROUND

Broadband wireless communications call for high data-rate and high performance. When a symbol duration is smaller than a delay spread of the communication channel, frequency-selective propagation effects arise. Therefore, it is important for broadband wireless applications to design single- or multi-antenna systems that account for frequency-selective multipath channels.

Space-time (ST) coded multi-antenna transmissions over flat fading channels take advantage of spatial diversity offered by multiple transmit, and possibly receive, antennas, and have been relatively effective in combating fading, and enhancing data rates. ST coding for frequency-selective channels has also been pursued using single-carrier, or, multi-carrier transmissions. These code designs, however, do not guarantee full space-multipath diversity. Some of these code designs may guarantee full diversity, but as they rely on ST block codes, they incur rate loss of up to 50% when the number of transmit antennas is greater than two.

Some techniques call for delay diversity schemes that transmit one symbol over two antennas in different time-slots. Other techniques call for a so-termed phase sweeping transmission that creates time-variations to an originally slow-fading channel. Unfortunately, both analog phase-sweeping and delay-diversity approaches consume extra bandwidth, and they do not enjoy joint space-multipath diversity.

SUMMARY

In general, space-time multipath (STM) coding techniques are described for frequency-selective channels respectively. The described STM coded system guarantees full space-multipath diversity, and achieves large coding gains with high bandwidth efficiency. The techniques utilize a linearly coding technique, and incorporates subchannel grouping for application of the linear coding techniques. As a result, the techniques enable desireable tradeoffs between performance and complexity.

Digital phase sweeping techniques are described that enable maximum joint space-multipath diversity, and large coding gains. The techniques also afford a low-complexity modular implementation, when working with linearly pre-coded small-size groups of symbols. The techniques achieve a high rate of operation, in symbols per second per frequency, regardless of a symbol constellation used, and for any number of transmit-receive-antennae.

In one embodiment, a wireless communication device comprises a linear precoder, a power splitter, and a plurality of antennas. The linear precoder linearly precodes a data stream to produce a precoded data stream. The power splitter produces a plurality of mirrored precoded data streams from the precoded data streams. The plurality of antennas output waveforms in accordance with the mirrored precoded data streams.

In another embodiment, a method comprises applying a linear precoder to a data stream to form a precoded data stream, and splitting the power of the precoded data stream to produce a plurality of mirrored precoded data streams. The method further comprises transmitting the mirrored precoded data stream with respective antennas.

In another embodiment, a method comprises linearly encoding blocks of N symbols a data stream with a matrix to form a precoded data stream, wherein N is an integer function of the number of antennas $N_t$ of a transmitter and an estimate number L of multi-path channels from the transmitter to a receiver. The method further comprises transmitting the precoded data stream with the antennas.

In another embodiment, a computer-readable medium comprises instructions to cause a programmable processor to apply a linear precoder to a data stream to form a precoded data stream. The instructions further cause the processor to split the power of the precoded data stream to produce a plurality of mirrored precoded data streams, and transmit the mirrored precoded data stream with respective antennas.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
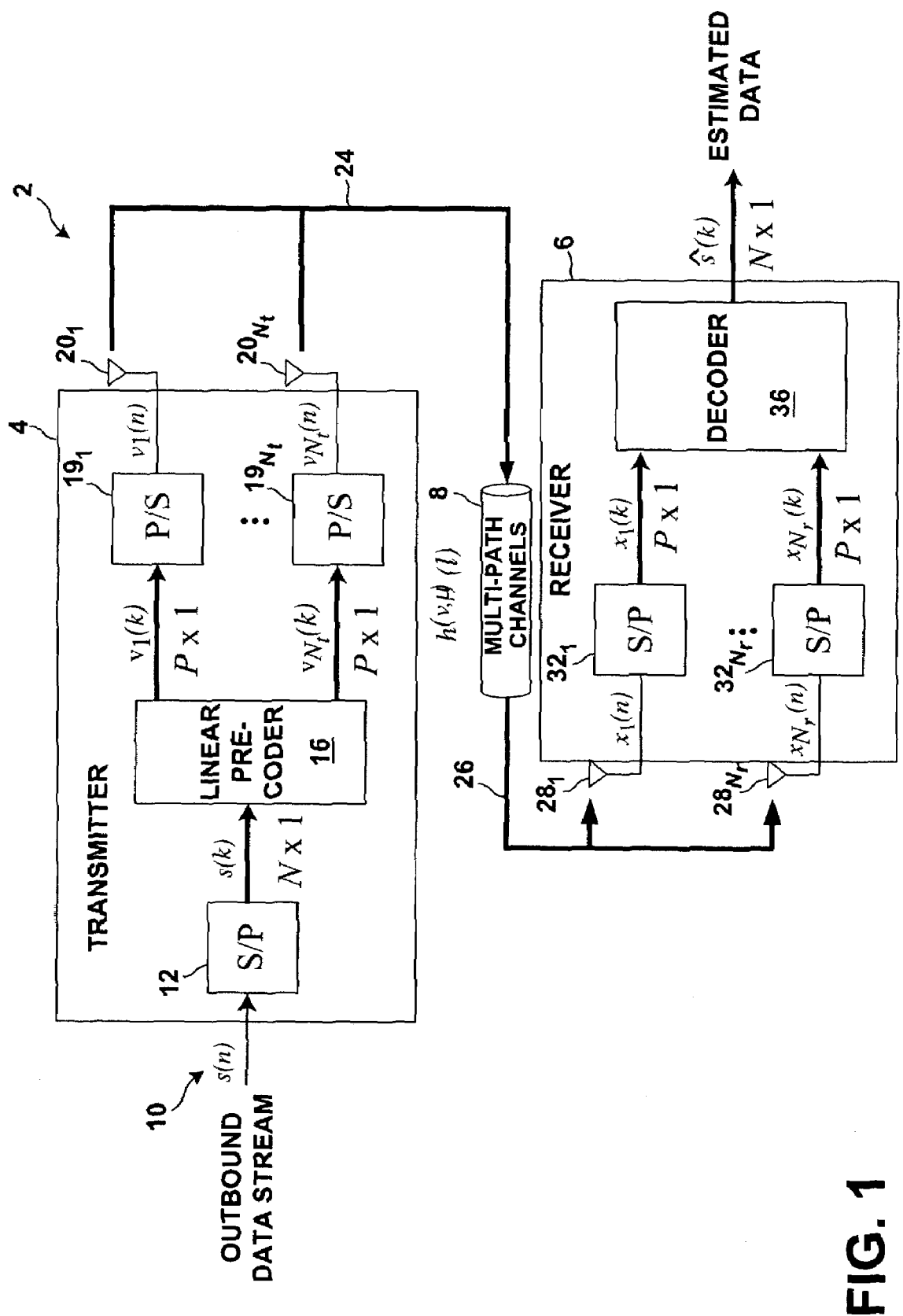
FIG. 1 is a block diagram illustrating an exemplary telecommunication system in which a transmitter and receiver implement the space-time multipath techniques described herein.

FIG. 1 is a block diagram illustrating a telecommunication system 2 in which transmitter 4 communicates data to receiver 6 through wireless channels 8. In general, transmitter 4 employs space-time multipath (STM) coding techniques to combat frequency-selective characteristics of multi-path channels 8.

Transmitter 4 includes a plurality of antennas $20_1$–$20_{Nt}$ for transmitting data to receiver 6. In particular, each antenna 20 outputs a waveform that propagates to receiver 6 through one or more multi-path communication channels. Transmitter 4 may output the waveforms using one of a number of conventional multi-user transmission formats, including Code Division Multiple Access (CDMA) and Orthogonal Frequency Division Multiplexing (OFDM). The former is an example of single-carrier multiple access scheme, while the latter is a multi-carrier scheme. OFDM has been adopted by many standards including digital audio and video broadcasting (DAB, DVB) in Europe and high-speed digital subscriber lines (DSL) in the United States. OFDM has also been proposed for local area mobile wireless broadband standards including IEEE802.11a, IEEE802g, MMAC and HIPERLAN/2.

The techniques described herein may be applied to uplink and/or downlink transmissions, i.e., transmissions from a base station to a mobile device and vice versa. Consequently, transmitters 4 and receivers 6 may be any device configured to communicate using a multi-user wireless transmission including a cellular distribution station, a hub for a wireless local area network, a cellular phone, a laptop or handheld computing device, a personal digital assistant (PDA), and the like.

As illustrated, transmitter 4 includes a serial-to-parallel (S/P) converter 12, a linear precoder 16, a plurality of parallel-to-serial (P/S) converters $19_1$–$19_{Nt}$, and a plurality of transmit antennas $20_1$–$20_{Nt}$. Receiver 6 includes a plurality of receive antennas $28_1$–$28_{Nr}$, a plurality of serial-to-parallel (S/P) converters $32_1$–$32_{Nr}$, and a decoder 36.

The information bearing symbols $\{s(n)\}$ are drawn from a finite alphabet $A_s$, and are parsed into blocks of size $N \times 1: s(k):=[s(kN), \ldots, s((k+1)N-1)]^T$. The linear encoder maps $s(k)$ to a codeword $$v_\mu(k) = \sum_{n=0}^{N-1} a_n^{(\mu)} [s(k)]_n + b_n^{(\mu)} [s(k)]_n^*, \forall \mu \in [1, N_t], \quad (1)$$

where $a_n^{(\mu)}$ and $b_n^{(\mu)}$ are P×1 vectors. As symbols and their complex conjugates are linearly combined to form the codeword $v_\mu(k)$ transmitted from the µth antenna during the kth block interval, we call the mapping in (1), a linear ST coder.

The fading channel between the µth transmit- and the vth receive-antenna is assumed to be frequency-selective. The sampled baseband equivalent impulse response vector (that includes transmit- and receive-filters) is given by:

$$h^{(v,\mu)} := [h^{(v,\mu)}(0), \ldots, h^{(v,\mu)}(L)]^T, \quad L := \left\lfloor \frac{\tau_{max}}{T_s} \right\rfloor, \quad (2)$$

where $\tau_{max}$ is the maximum delay among all paths (delay spread), $T_s$ is the symbol (equal to the sampling) period, and L denotes the maximum order of all (v,µ) channels. We assume ideal carrier synchronization, timing and symbol-rate sampling. At the vth receive-antenna, the symbol rate sampled sequence $x_v(n)$ at the receive-filter output is $$x_v(n) = \sum_{\mu=1}^{N_t} \sum_{l=0}^{L} h^{(v,\mu)}(l) v_\mu(n-l) + \zeta_v(n), \quad (3)$$

where $v_\mu(n) := [v_\mu(k)]_n$, and $\zeta_v(n)$ is complex additive white Gaussian noise (AWGN) with mean zero, and variance $\sigma_\zeta^2 = N_0$.

The symbols $x_v(n)$ are serial-to-parallel (S/P) converted to form P×1 blocks $x_v(k):=[x_v(kP), \ldots, x_v(kP+P-1)]^T$. The matrix-vector counter part of (3) is $$x_v(k) = \sum_{\mu=1}^{N_t} \left( H^{(v,\mu)} v_\mu(k) + H_{ibi}^{(v,\mu)} v_\mu(k-1) \right) + \zeta_v(k), \quad (4)$$

where $H^{(v,\mu)}$ is a lower triangular Toeplitz matrix with first column $[h^{(v,\mu)}(0), \ldots, h^{(v,\mu)}(L), 0, \ldots, 0]^T$, $H_{ibi}^{(v,\mu)}$ is an upper triangular Toeplitz matrix with first row $[0, \ldots, 0, h^{(v,\mu)}(L), \ldots, h^{(v,\mu)}(1)]$, and $\zeta_v(K)$ is the AWGN vector.

As described, system 2 is a linearly ST coded system capable of collecting the maximum joint space-multipath diversity as well as large coding gains with high bandwidth efficiency $\forall N_t \geq 2$.

We will first introduce criteria for designing our STM codes, based on these assumptions:

A1) Channel taps $\{h^{(v,\mu)}(t)\}$ are zero-mean, complex Gaussian random variables;

A2) Channel state information (CSI) is available at the receiver, but unknown to the transmitter;

A3) High SNR is considered for deriving the STM diversity and coding gains.

When transmissions experience rich scattering, and no line-of-sight is present, the central limit theorem validates A1). Notice that we allow not only for independent random channel coefficients, but also for correlated ones. A2) motivates the use of ST coding altogether. A3) is useful for asserting optimality of our designs, but is not required for the system operation.

Since our design will allow for correlated channels, we will denote the $N_t N_r (L+1) \times N_t N_r (L+1)$ channel correlation matrix and its rank, respectively, by:

$$R_h := E[hh^H], \text{ and } r_h := \text{rank}(R_h) \leq N_t N_r (L+1), \quad (5)$$

where the $N_tN_r(L+1)\times 1$ channel vector is $h:=[h^{(1,1)}(0),\ldots,h^{(1,1)}(L),\ldots,h^{(1,N_t)}(L),\ldots,h^{(N_r,N_t)}(L)]^T$. We summarize our performance results for the linearly coded systems as follows (see Appendix A for a proof):

Proposition 1 At high SNR, the maximum space-multipath diversity order achieved by maximum likelihood (ML) decoding any linearly coded ST transmission is:

$$G_d^{max} = r_h \le N_t N_r(L+1). \quad (6)$$

When the channel correlation matrix $R_h$ has full rank, the maximum coding gain for any linearly ST coded system is $$G_c^{max} = (det(R_h))^{\frac{1}{r_h}} \frac{d_{min}^2}{N_t}, \quad (7)$$

where $d_{min}$ is the minimum Euclidean distance of the constellation points in the finite alphabet $A_s$.

Proposition 1 has the following qualities:
a) it derives in closed-form the maximum coding gain of all linearly coded ST transmissions;
b) it quantifies the diversity order $G_d^{max}$ for any linearly coded ST system, and can in fact be generalized to include also Galois-Field coded symbols;
c) it allows for correlated channels which is important since practical frequency-selective channels are correlated with an exponential power profile.

Figure 2:
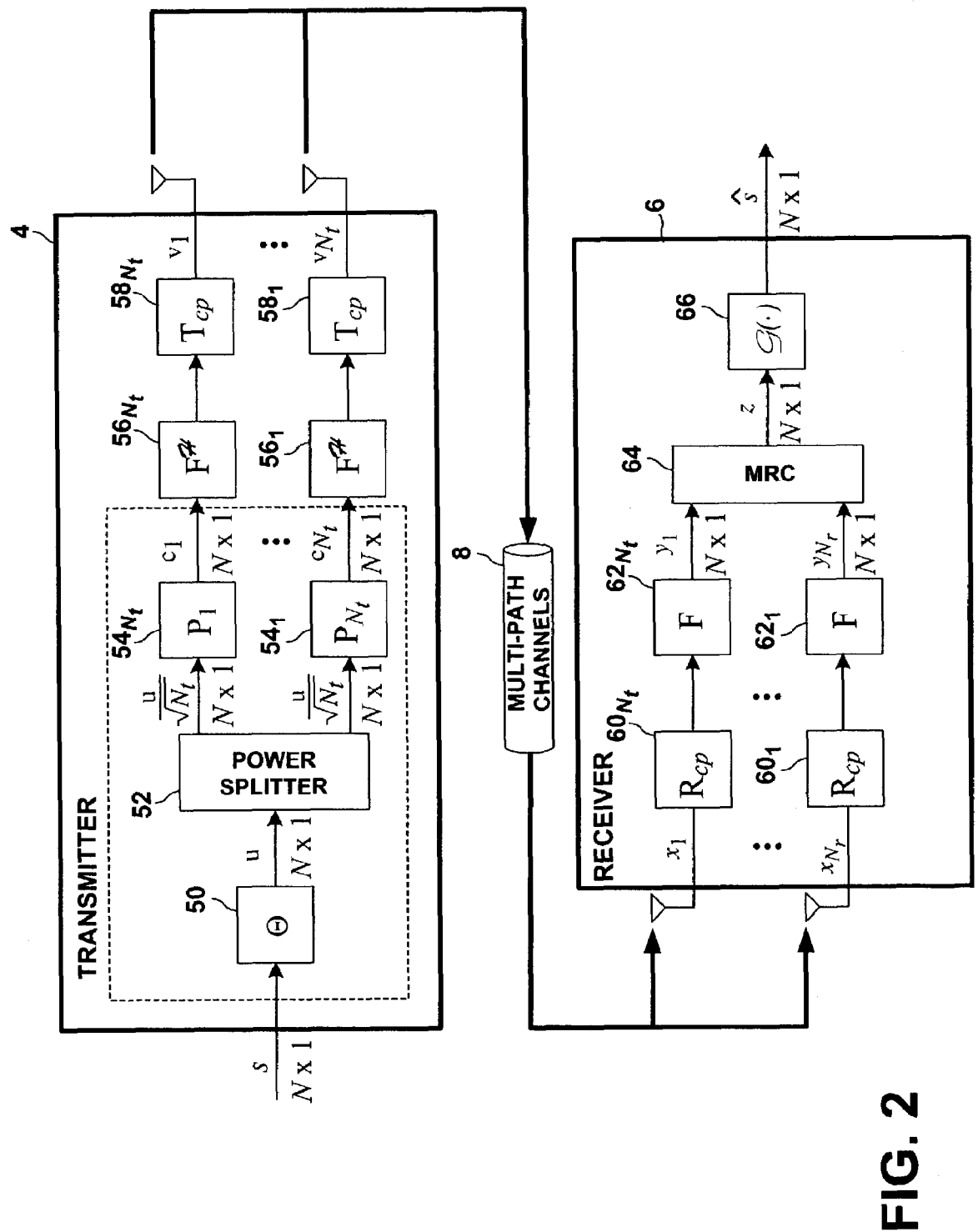
FIG. 2 is a block diagram illustrating transmitter and receiver of FIG. 1 in further detail.

FIG. 2 is a block diagram illustrating additional embodiments of transmitter 4 and receiver 6 of FIG. 1. As illustrated, transmitter 4 and receiver 6 can be viewed as comprising three stages (pairs of encoders/decoders): an outer codec, a middle codec, and an inner codec. The outer codec includes a linear constellation precoding matrix $\Theta$ 50 of transmitter 4 and a corresponding decoder $G(\cdot)$ 66 of receiver 6. The middle codec implements our digital phase sweeping (DPS) scheme, and includes a power splitter 52 along with a set of DPS modules 54 to apply matrices $$\{\Phi_\mu\}_{\mu=1}^{N_t}$$

at transmitter 4, and a maximum ratio combiner (MRC) 64 of receiver 6. In this example, the inner codec performs orthogonal frequency division multiplexing (OFDM). Specifically, transmitter 4 includes modules 56 for performing an inverse fast Fourier transform (IFFT) operation (via the matrix $F_N^H$), followed by modules 58 for performing cyclic-prefix (CP) insertion that can described as a matrix $T_{cp}$. At receiver 6, the inner decoder performs two mirror operations: modules 60 remove the CP via a matrix $T_{cp}$, and modules 62 perform the FFT. The CP-insertion and removal matrices are given, respectively as:

$$T_{cp} := \begin{bmatrix} I_{cp} \\ I_N \end{bmatrix}, R_{cp} := [0_{N\times L_{cp}} \ I_N], \quad (8)$$

where $L_{cp}$ is the CP length, and $I_{cp}$ denotes the last $L_{cp}$ rows of $I_N$. Based on these definitions, the input-output relationship from $c_\mu$ to $y_\mu$ (see FIG. 2) can be expressed as:

$$y_v = \rho \sum_{\mu=1}^{N_t} F_N R_{cp} H^{(v,\mu)} T_{cp} F_N^H c_\mu + \xi_v, \quad \forall v \in [1, N_r], \quad (9)$$

where $p:=\sqrt{N/(N+L_{cp})}$ is a power-normalizing constant; the $\xi_v$'s are independent identically distributed (i.i.d.) AWGN vectors; and $c_\mu$ is the output of the middle encoder $\Phi_\mu$. It is well-known that by (inserting) removing the CP and (I)FFT processing, a frequency-selective channel becomes equivalent to a set of flat-fading sub-channels. Mathematically, one can express this proper via:

$$F_N R_{cp} H^{(v,\mu)} T_{cp} F_N^H = D_H^{(v,\mu)}, \forall v, \mu, \quad (10)$$

where $D_H^{(v,\mu)} := diag[H^{(v,\mu)}(0), \ldots, H^{(v,\mu)}(N-1)]$, with $H^{(v,\mu)}(n) := \sum_{l=0}^{L} h^{(v,\mu)}(l) e^{-j2\pi nl/N}$.

Using (10), we can simplify (9) as:

$$y_v = \rho \sum_{\mu=1}^{N_t} D_H^{(v,\mu)} c_\mu + \xi_v, \quad \forall v \in [1, N_r]. \quad (11)$$

Comparing (11) with (4), we confirm that the inner codec (OFDM) removes the inter-block interference (IBI), and also diagonalizes the channel matrices.

The middle encoder implements the phase sweeping techniques described herein. In a two transmit-antenna analog implementation, the signal of one antenna is modulated by a sweeping frequency $f_s$ in addition to the carrier frequency $f_c \gg f_s$, that is present in both antennas. This causes bandwidth expansion by $f_s$ Hz. In the following, we will derive a digital phase sweeping (DPS) encoder. Combined with OFDM, DPS will convert $N_t$ frequency-selective channels, each having (L+1) taps, to a single longer frequency-selective channel with $N_t(L+1)$ taps. Toward this objective, let us rewrite the diagonal channel matrix in (10) as:

$$D^{(v,\mu)} = \sum_{l=0}^{L} h^{(v,\mu)}(l) D_l, \forall v \in [1, N_r], \quad (12)$$

where $D_l:=diag[1,exp(-j2\pi l/N), \ldots, exp(-j2\pi l(N-1)/N)]$. Eq. (12) discloses that different channels may have different channel taps $h^{(v,\mu)}(l)$, but they all share common lags (l) that manifest themselves as common shifts in the FFT domain. Suppose that we shift the L+1 taps of each channel corresponding to one of the $N_t$ transmit antennas so that all channel taps become consecutive in their delay lags. Then, we can view the $N_t$ channels to each receive-antenna as one longer frequency-selective channel with $N_t(L+1)$ taps. To realize this idea digitally, we select matrices $$\{\Phi_\mu\}_{\mu=1}^{N_t}$$

as $$\Phi_\mu = \text{diag}[1, e^{j\phi_\mu}, \ldots, e^{j\phi_\mu(N-1)}], \quad \forall \mu \in [1, N_t], \quad (13)$$

where $\phi_\mu = -2\pi(\mu-1)(L+1)/N$. Based on (12) and (13), we have that $$D_l \Phi_\mu = D_{l+(\mu-1)(L+1)}, \forall l \in [0,L], \mu \in [1, N_t]. \quad (14)$$

Let us now define the equivalent longer channel vector corresponding to the $v$th receive-antenna as:

$$h^{(v)} = [(h^{(v,1)})^T, \ldots, (h^{(v,N_t)})^T]^T \quad (15)$$

with the lth entry of $h^{(v)}$ given by: $h^{(v)}(l) = h^{(v,[l/(L+1)]+1)}$ (l mod (L+1)). Since $h^{(v)}$ in (15) has length $N_t(L+1)$, we can view it as coming from a single frequency-selective channel. According to (14), we define the diagonal matrix of the longer equivalent channel as:

$$D_H^{(v)} := \sum_{\mu=1}^{N_t} D_H^{(v,\mu)} \Phi_\mu = \sum_{l=0}^{N_t(L+1)-1} h^{(v)}(l) D_l. \quad (16)$$

Figure 2A:
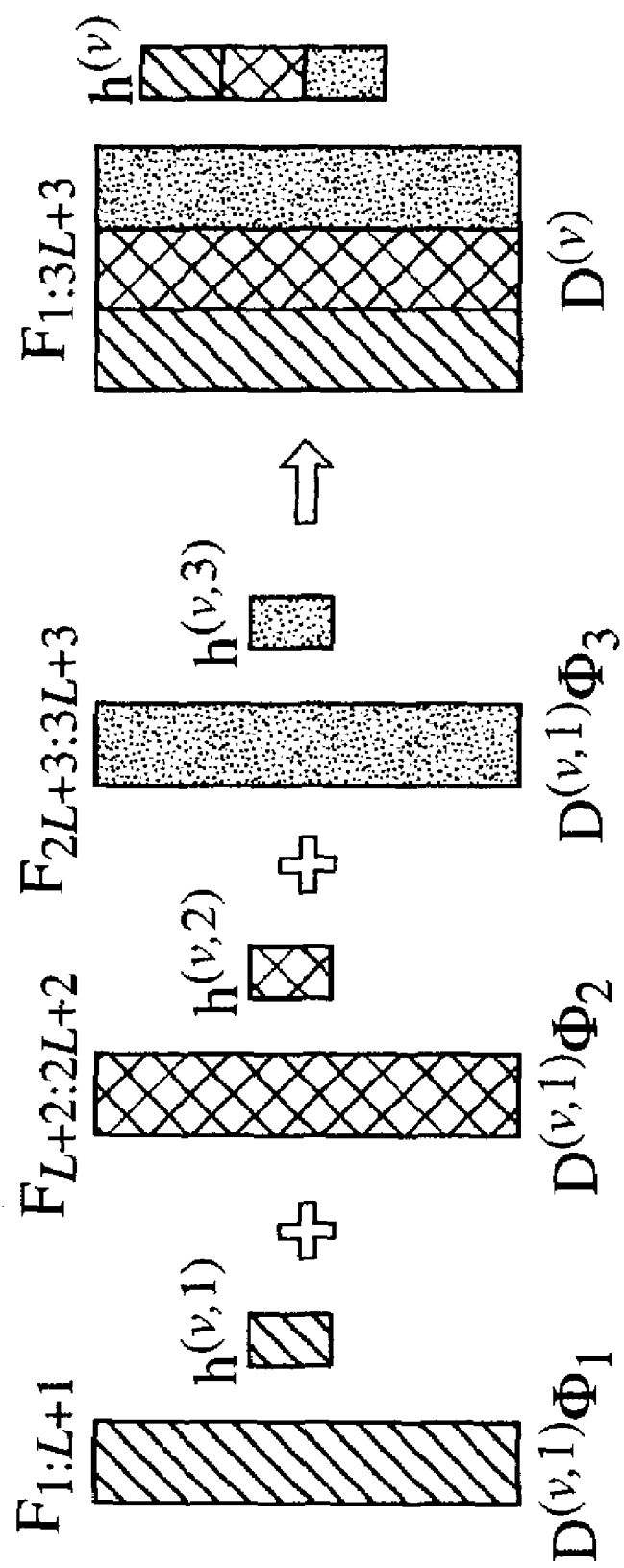
FIG. 2A illustrates how three multi-path channels can be viewed as one longer channel.

In essence, the DPS matrix $\Phi_\mu$ shifts the delay lags of the $\mu$th channel (c.f. (14)) from $[0,L]$ to $[(\mu-1)(L+1) \cdot \mu(L+1)-1]$. For example, when $\mu=1$, $\Phi_1 = I_N$ and then $D^{(v,1)}\Phi_1 = \text{diag}(\sqrt{N}F_{0:L}h^{(v,1)})$, where $F_{0:L}$ denotes the first $L+1$ columns of $F_N$. When $\mu=2$, $D^{(v,2)}\Phi_2 = \text{diag}(\sqrt{N}F_{(L+1):(2L+1)}h^{(v,2)})$, where $F_{(L+1):(2L+1)}$ denotes the $(L+1)$st up to $(2L+1)$st columns of $F_N$. Proceeding likewise with all $N_t$ DPS matrices, we can also obtain (16). FIG. 2A illustrates how three multi-path channels can be viewed as one longer channel.

We summarize this observation in the following:

Property 1: DPS converts the $N_t$ transmit-antenna system, where each frequency-selective channel has $L+1$ taps, to a single transmit-antenna system, where the equivalent channel has $N_t(L+1)$ taps.

Remark 1 To avoid overlapping the shifted bases, we should make sure that $N > N_t(L+1)$. From the definition of the channel order $L := \lfloor \tau_{max}/T_s \rfloor$, we have that for fixed $\tau_{max}$ and $N$, we can adjust the sampling period $T_s$ to satisfy this condition, or equivalently, for fixed $T_s$ and $\tau_{max}$, we can adjust the block size $N$. Since for each receive-antenna we have $N_t(L+1)$ unknown channel tape corresponding to $N_t$ channels every $N$ symbols, this condition guarantees that the number of unknowns is less than the number equations. Therefore, even from a channel estimation point of view, this condition is justifiable.

Using the DPS matrices (13), we will normalize (power split) $\Phi_\mu$ to obtain the middle encoder output $c_\mu = \Phi_\mu u/\sqrt{N_t}$, $\forall \mu \in [1, N_t]$. The input-output relationship (11) can then be rewritten as [c.f. (16)]:

$$y_v = \frac{\rho}{\sqrt{N_t}} D_H^{(v)} u + \xi_v, \quad \forall v \in [1, N_r]. \quad (17)$$

To collect the full diversity and large coding gains, we not only need to design the transmitter properly, but we must also select a proper decoder at the receiver. Since the received blocks $y_v$ from all $N_T$ receive-antennas contain the information block s, we need to combine the information from all received blocks to decode s. To retain decoding optimality, we perform maximum ratio combining (MRC). The MRC amounts to combining $\{y_v\}$ in (17) to form $z = Gy$ using the matrix $$G = \left( \sum_{v=1}^{N_r} D_H^{(v)} (D_H^{(v)})^* \right)^{-\frac{1}{2}} [(D_H^{(1)})^* \cdots (D_H^{(N_r)})^*], \quad (18)$$

and $y = [y_1^T, \ldots, y_{N_r}^T]^T$.

Existence of the inverse in (18), requires the channels $$D_H^{(v)}$$

to satisfy the coprimeness condition:

$$\det\left( \sum_{v=1}^{N_r} D_H^{(v)} (D_H^{(v)})^* \right) \neq 0. \quad A4)$$

Assumption A4) is more technical rather than restrictive, since it requires that the equivalent channels do not have common channel nulls. Indeed, for random channels, A4) excludes an event with probability measure zero.

With the MRC of (18), the vector z is given by [c.f. (17)]:

$$z = \frac{\rho}{\sqrt{N_t}} \left( \sum_{v=1}^{N_r} D_H^{(v)} (D_H^{(v)})^* \right)^{\frac{1}{2}} u + \eta, \quad (19)$$

where $\eta := G[\zeta_1^T, \ldots, \zeta_{N_r}^T]^T$.

Under A4), it can be verified that G satisfies $GG^H = I$. Since the $\zeta_v$'s are uncorrelated AWGN blocks, the noise vector $\eta$ retains their whiteness. From (19) and (11), we deduce that the middle codec has converted a multi-input multi-output system into a single-input single-output system with longer impulse response.

To achieve full diversity, we still need to design the outer codec properly. If there is no precoding, i.e., $u = s$, the diversity order is one even if maximum likelihood decoding is used. To enable the full $N_t(L+1)$ space-multipath diversity established by Proposition 1, we also need to design the precoder $\Theta$ judiciously.

As illustrated in FIG. 2, the outer codec utilizes linear constellation precoding. In particular, we design $\Theta$ using a Grouped Linear Constellation Precoding (GLCP) scheme described in U.S. Provisional Application Ser. No. 60/374,935, entitled "LINEAR CONSTELLATION PRECODING FOR FADING COMMUNICATION CHANNELS," filed Apr. 22, 2002, and U.S. patent application Ser. No. 10/420,353, filed Apr. 21, 2003, entitled "WIRELESS COMMUNICATION SYSTEM HAVING LINEAR ENCODER," the entire contents of which are incorporated herein by reference. GLCP provides a means of reducing decoding complexity without sacrificing diversity or coding gains. To apply GLCP, we select the transmitted block size $N = N_g N_{sub}$, and demultiplex the information vector s into $N_g$ groups:

$$\{s_g\}_{g=0}^{N_g-1},$$

with each group having length $N_{sub}$; e.g., and the gth group contains the symbols collected in a vector $s_g$ as follows:

$$s_g = [[s]_{N_{sub}g}, \ldots, [s]_{N_{sub}(g+1)-1}]^T, \forall g \in [0, N_g-1]. \quad (20)$$

Correspondingly, we define the gth linearly precoded group as:

$$u_g = \Theta_{sub} s_g, \forall g \in [0, N_g-1], \quad (21)$$

where $\Theta_{sub}$ is an $N_{sub} \times N_{sub}$ matrix. To enable the maximum diversity, we select $\Theta_{sub}$ from the algebraic designs of [24]. The overall transmitted block u consists of multiplexed sub-blocks $$\{u_g\}_{g=0}^{N_g-1}$$

as follows:

$$u = [[u_0]_0, \ldots [u_{N_g-1}]_0; \ldots; [u_0]_{N_{sub}-1}, \ldots [u_{N_g-1}]_{N_{sub}-1}]^T. \quad (22)$$

It is not difficult to verify that u can be obtained from $$\{u_g\}_{g=0}^{N_g-1},$$

via a block interleaver with depth $N_{sub}$. Equivalently, it turns out that u can be related to s as $$u = \Theta s, \text{ with } \Theta := \begin{bmatrix} I_{N_g} \otimes \theta_1^T \\ \vdots \\ I_{N_g} \otimes \theta_{N_{sub}}^T \end{bmatrix}, \quad (23)$$

where $\theta_m^T$ is the mth row of $\Theta_{sub}$. Equations (20)–(22), or equivalently (23), summarize how the GLCP encoder is applied to our DPS based STM design.

To decode LCP transmissions, we split z in (19) into $N_g$ groups:

$$z_g = \frac{\rho}{\sqrt{N_t}} D_{H,g} \Theta_{sub} s_g + \eta_g, \forall g \in [0, N_g-1], \quad (24)$$

where $z_g := [[z]_g, [z]_{N_{sub}+g}, \ldots, [z]_{N_{sub}(N_g-1)+g}]^T$, $D_{H,g}$ is the corresponding diagonal sub-matrix from $$\left( \sum_{\nu=1}^{N_r} D_H^{(\nu)} (D_H^{(\nu)})^* \right)^{\frac{1}{2}}$$

for the gth group; and similarly defined, $\eta_g$ is the corresponding AWGN vector from $\eta$. Maximum likelihood (ML) decoding of z can, for example, be implemented by applying a Sphere Decoding (SD) algorithm of sub-blocks $z_g$ of small size $N_{sub}$. Compared to the exponentially complex ML decoder, the SD offers near-ML performance at complexity of order $$O(N_{sub}^\alpha).$$

The SD complexity depends on the block size $N_{sub}$, but unlike ML, it is independent of the constellation size.

Figure 3:
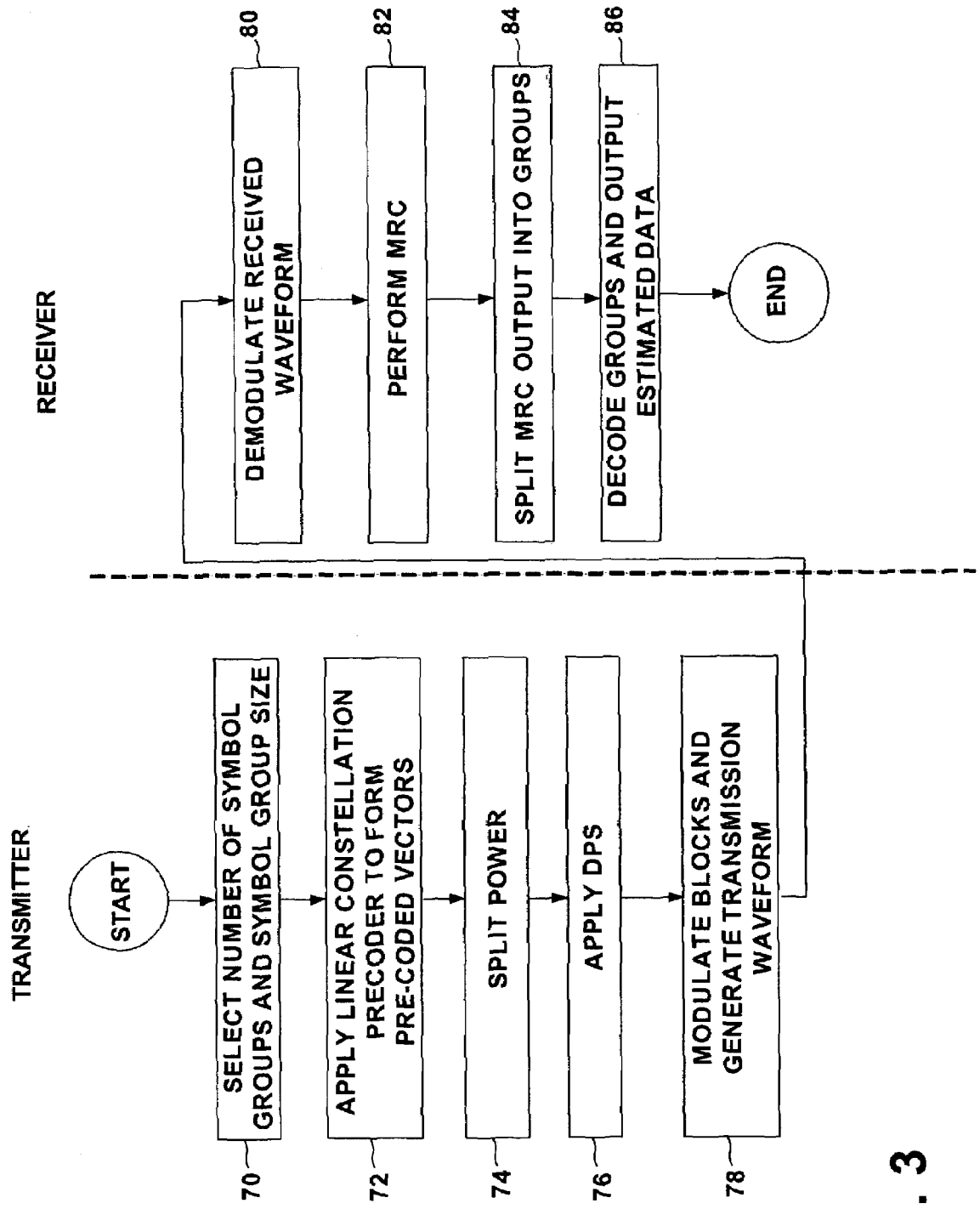
FIG. 3 is a flowchart that illustrates operation of the DPS-based space-time multipath techniques describe herein.

FIG. 3 is a flowchart that illustrates operation of the DPS-based space-time multipath techniques describe herein. For exemplary purposes, the operation is described in reference to FIG. 2.

Given $N_t$, $N_r$ and L, transmitter 4 selects the number of groups Ng, and the corresponding group size $N_{sub}$ depending on affordable complexity; and selects $N = N_g N_{sub} \geq N_t(L+1)$ (step 70).

Linear precoder 16 applies the $N_{sub} \times N_{sub}$ linear constellation precoder $\Theta_{sub}$ to form a precoded data stream, i.e., the precoded vectors u, according to equations (20)–(22) (step 72). Power splitter 52 splits the power of u to form mirrored precoded data streams $u/\sqrt{N_t}$ (step 74).

DPS modules 54 apply DPS via $\Phi_\mu$ to u, and obtain $c_\mu = \Phi_\mu u/\sqrt{N_t}, \forall \mu \in [1, N_t]$ (step 76). In particular, transmitter 4 estimates a delay lag for each of a plurality of multi-path channels from transmitter 4 to receiver 6, and computes a single channel vector from the estimated delay lags for the channels. DPS modules 54 (FIG. 2) processes the mirrored precoded data streams with the single channel vector to shift the delay lag of each of the channels so that channel taps become consecutive. Finally, transmitter 4 modulates each block $c_\mu$ using OFDM and generates a transmission waveform via transmission antennas 20 (step 78).

Receiver 6 receives a waveform via receive antennas 28, and demodulates the received waveform (step 80). Next, receiver 6 performs MRC of blocks from all of the receive antennas 28 as in (19) (step 82). Finally, receiver 6 splits the MRC output block into Ng groups (step 84), and implements a scheme, e.g., ML or Sphere, to decode each reduced size group as in equation (24) to provide the estimated data (step 86).

The diversity gain for the STM techniques described herein can be summarized in the following proposition:

Proposition 2 The maximum achievable space-multipath diversity order $$G_d^{max} = r_h$$

is guaranteed by our STM design, provided that we select $N_{sub} \geq N_t(L+1)$. When the channel correlation matrix $R_h$ has full rank $r_h = N_r N_t(L+1)$, our STM design achieves (as p= $\sqrt{N/(N+L_{cp})} \to 1$) the maximum possible coding gain among all linearly coded ST systems. The coding gain of our STM scheme is given in closed form by:

$$G_c = (det(R_h))^{\frac{1}{r_h}} d_{min}^2 N / (N_t(N+L_{cp})).$$

The transmission rate of our design is $N/(N+L_{cp})$ symbols/sec/Hz, $\forall N_t, N_r$.

Our choice of the group size $N_{sub}$ determines whether the maximum diversity order can be achieved. In fact, $N_{sub}$ offers flexibility to tradeoff between performance and decoding complexity. When $N_{sub} \leq N_t(L+1)$, as $N_{sub}$ decreases, the decoding complexity decreases, while at the same time, the diversity order decreases. By adjusting $N_{sub}$, we can balance the affordable complexity with the required performance. This is important because for a large number of transmit-receive antennae, or large delay spreads one does not have to strike for diversity orders greater than four (which in fact show up for unrealistically high SNRs). In such cases, small $N_{sub}$ sizes (2 or 4) are recommended because they allow for ML decoding with reduced complexity.

Corollary 1 When $R_h$ has full rank; i.e., $r_h = N_t N_r(L+1)$, our STM achieves diversity order $G_d = N_{sub} N_r$ when $N_{sub} < N_t(L+1)$ and $G_d = N_t N_r(L+1)$ when $N_{sub} \geq N_t(L+1)$.

In the context of frequency-selective channels, the STM techniques described herein offer the following attractive features:

1) STM enables full space-multipath diversity gain $r_h \leq N_t N_r(L+1)$;
2) STM guarantees large coding gain;
3) STM is flexible to strike desirable performance-complexity tradeoffs;
4) compared with ST block codes, STM suffers no rate loss $\forall N_t, N_r$;
5) compared with ST trellis codes, STM affords easier code construction and constellation-independent decoding complexity.

Table 1 illustrates quantitative comparisons of the space-time multipath (STM) techniques described herein with existing alternatives for both single- and multi-carrier.

to permuting the rows of $F_N^H$ circularly. Therefore, there exists an N×N permutation matrix $P_\mu$ such that $$P_\mu F_N^H = F_N^H \Phi_\mu, \quad \forall \mu \in [1, N_t], \tag{26}$$

where $$P_\mu := \begin{bmatrix} 0 & I_{(\mu-1)(L+1)} \\ I_{N-(\mu-1)(L+1)} & 0 \end{bmatrix} \quad \forall \mu \in [1, N_t]. \tag{27}$$

Figure 4:
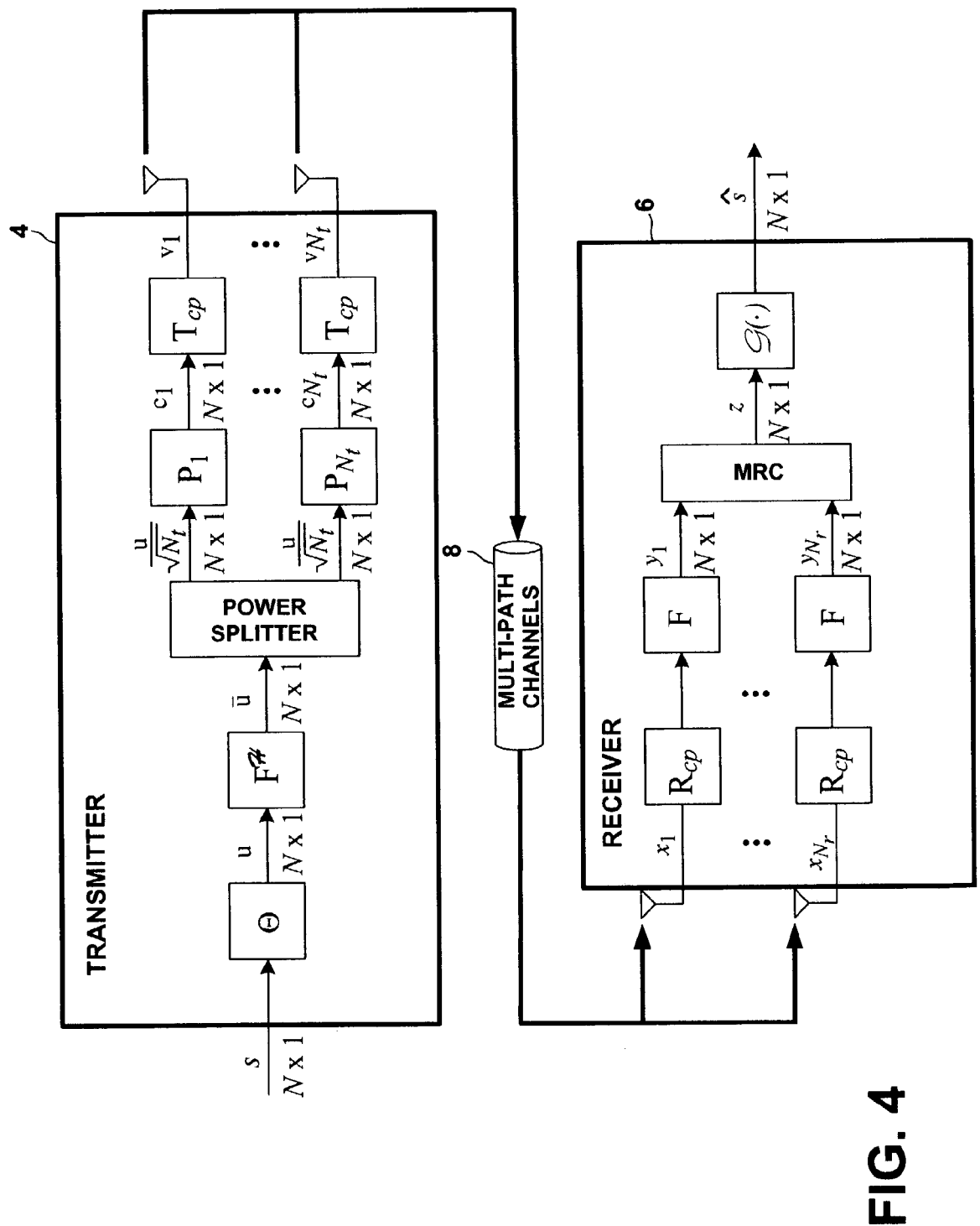
FIG. 4 is a block diagram illustrating the system of FIG. 1 as applied to multi-carrier space-time multipath communication.

Using the property in (26), we can rewrite (9) as (see also FIG. 4)

$$y_\nu = \frac{\rho}{\sqrt{N_2}} \sum_{\mu=1}^{N_t} F_N R_{c\mu} H^{(\nu,\mu)} T_{c\mu} P_\mu F_N^H u + \xi_\nu, \quad \forall \nu \in [1, N_r]. \tag{28}$$

Defining $\bar{u} := F_N^H u$, and based on the definition of $P_\mu$ in (27), we find that $$\sqrt{N_t} c_\mu = P_\mu \bar{u} = [[\bar{u}]_{[\mu-1][L+1]}, \ldots, [\bar{u}]_N, \ldots, [\bar{u}]_{[\mu-1][L+1]-1}]^T. \tag{20}$$

Figure 5:
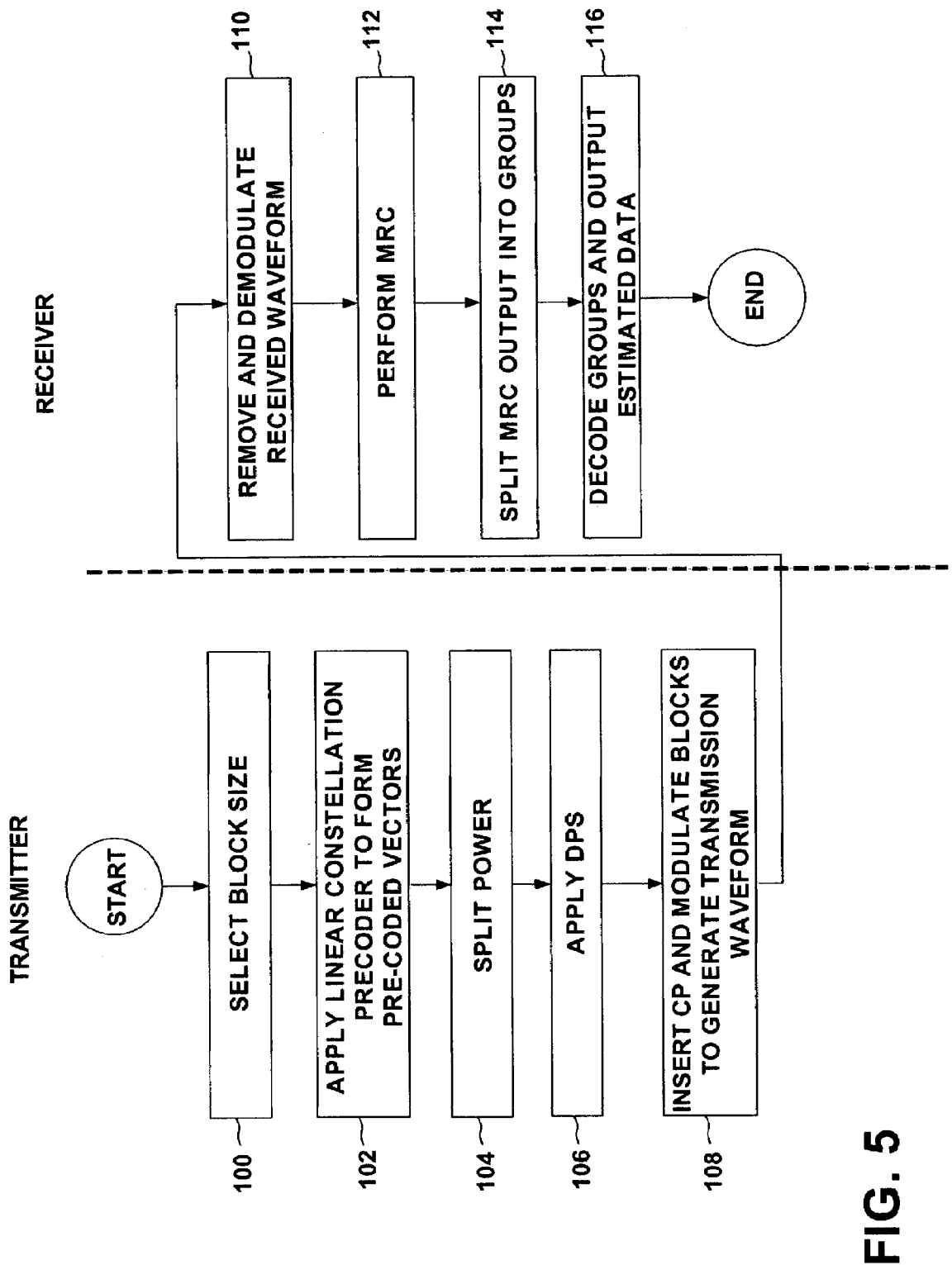
FIG. 5 is a flowchart that illustrates application of the STM techniques to single-carrier systems.
Figure 5A:
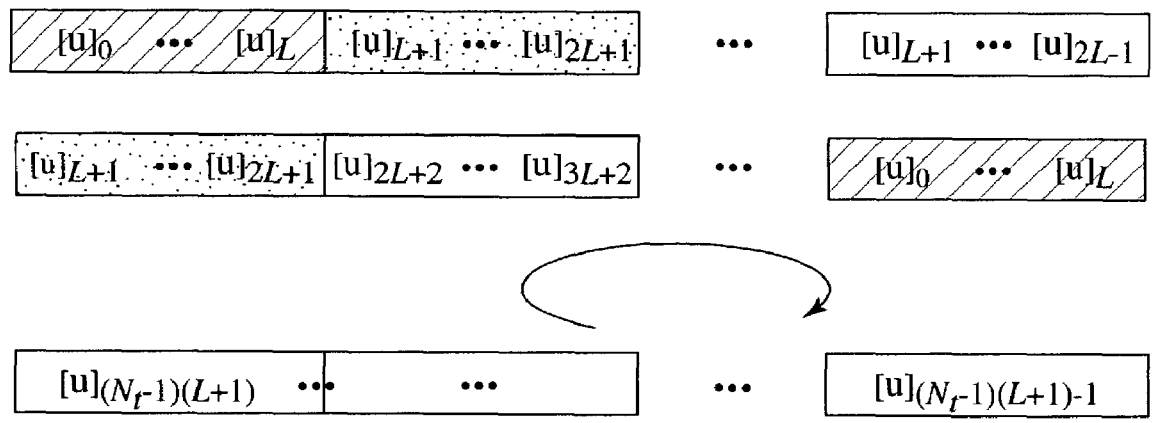
FIG. 5A illustrates how the transmit blocks for each antenna in a multi-antenna system is a circularly delayed version of the previous ones.

We infer from (29) that the transmitted blocks $c_\mu$ on the μth antenna is a circularly delayed version of the previous ones (see FIG. 5A). We summarize the analysis above as follows:

TABLE I

| schemes | STM | STF [13] | ZP-only [25] | DD [6] | DD [15] |
|---|---|---|---|---|---|
| $N_t$ | $\forall N_t$ | $\forall N_t$ | $\forall N_t$ | 2 | 2 |
| $N_r$ | $\forall N_r$ | $\forall N_r$ | $\forall N_r$ | 1 | 1 |
| decoder | SD | SD | VA | VA | MF |
| complexity | $O((N_t(L+1))^\alpha)$ | $O((L+1)^\alpha)$ | $O((\log|A_s|)^{(L+1)})$ | / | / |
| $G_d$ | $N_t N_r(L+1)$ | $N_t N_r(L+1)$ | $N_t N_r(L+1)$ | $2(L+1)$ | $L+2$ |
| $G_c$ | $\frac{N d_{min}^2}{(N+L_{cp})N_t}$ | $\frac{N d_{min}^2}{(N+L_{cp})N_t}$ | $\frac{d_{min}^2}{N_t}$ | / | / |
| rate (s/s/Hz) | $\frac{N}{N+L_{cp}}$ | $\frac{N}{N+L_{cp}} r_{stbc}$ | $\frac{N}{N+L_{cp}} r_{stbc}$ | $\frac{N}{N+2L+1}$ | $\frac{N}{N+L+2}$ |

In Table 1, SD, VA, and MF stand for sphere decoding, Viterbi's algorithm, and matched filter, respectively; and $R_{stbc}$ denotes a rate of the orthogonal ST block code.

The STM coding techniques may be applied to both single- and multi-carrier systems. The following provides further details regarding multi-carrier systems.

Recalling $\Phi_\mu$ in (13), it is easy to show using the IFFT matrix definition that $$F_N^H \Phi_\mu := \begin{bmatrix} f_0^T \\ \vdots \\ f_{N-1}^T \end{bmatrix} \Phi_\mu = \begin{bmatrix} f_{(\mu-1)(L+1)}^T \\ \vdots \\ f_{(\mu-1)(L+1)-1}^T \end{bmatrix}, \tag{25}$$

where $f_n^T$ is the nth row of $F_N^H$. Eq. (25) shows that left multiplying matrix $\Phi_\mu$ by the IFFT matrix $F_N^H$ is equivalent Property 2: A DPS-based transmission (FIG. 2) is equivalent to a circular delay diversity (CDD) transmission given in (FIG. 4).

Unlike conventional delay diversity designs, the DPS-based (or equivalently CDD-based) STM scheme described herein does not sacrifice bandwidth efficiency. Compared to the STM design in FIG. 2, the equivalent multi-carrier system of FIG. 4 has lower complexity because it requires only one IFFT operation (instead of $N_t$ IFFT operations).

FIG. 5 is a flowchart that illustrates application of the STM techniques to single-carrier systems. For exemplary purposes, the operation is described in reference to FIG. 1.

Given $N_t$, $N_r$ and L, depending on affordable complexity, transmitter 4 selects a block size $N > N_t(L+1)$ (step 100).

Transmitter 4 applies a N×N linear constellation precoder $\Theta$ according to (25) and forms precoded vectors $u = \Theta s$ (step 102). Transmitter 4 splits the power of u to form $u/\sqrt{N_t}$ (step 104).

Transmitter 4 applies a circular delay (via $P_\mu$) per antenna, to obtain $c_\mu = P_\mu u/\sqrt{N_t}$, $\forall \mu \in [1, N_t]$. (step 106). Finally, transmitter 4 inserts CP, and modulates each block $c_\mu$ to generate a transmission waveform (step 108).

Receiver 6 receives a waveform, removes the CP, and applies an FFT to demodulate each block of the received data stream (step 110). Next, receiver 6 performs MRC of blocks from all of the receive antennas 28 as is (19) (step 112). Finally, receiver 6 implements a scheme, e.g., ML decoding, sphere decoding, Viterbi's algorithm, to decode each reduced size group as in (24) to provide the estimated data (step 116).

EXAMPLES

Figure 6:
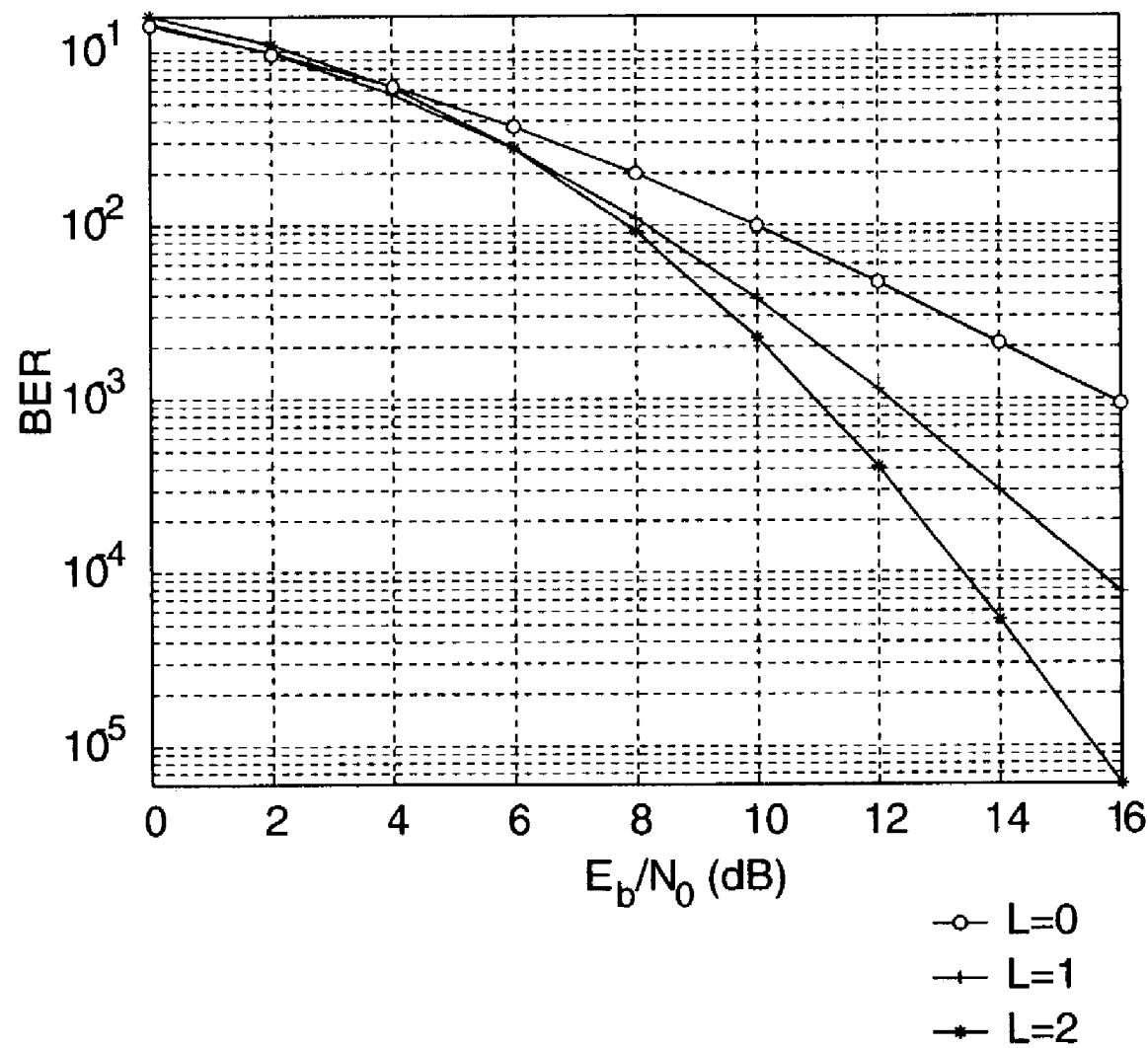
FIGS. 6–8 are graphs that illustrate exemplary results of simulations of the described techniques.

Test case 1: To illustrate the effects of multipath diversity, we first simulated the performance of the STM techniques with $N_t=2$ transmit and $N_r=1$ receive antennae in the presence of multi-ray channels with different channel orders L=0, 1, 2. The channel taps were i.i.d. Gaussian random variables with zero mean and variance 1/(L+1) were used. The CP length was $L_{cp}=L$. QPSK modulation was selected. The sub-block size was $N_{sub}=N_t(L+1)$ and the number of sub-blocks was $N_g=6$. The information block length was $N=N_{sub}N_g$. FIG. 6 depicts the average bit error rate (BER) versus SNR of the STM techniques. We observe that as the channel order L increased, the STM techniques achieved higher diversity order.

Test case 2: To illustrate the tradeoff of diversity with complexity, we adjusted the group size $N_{sub}$. The parameters and the channel model were the same as in Test case 1, except that the channel order L was fixed as L=2. In this case, $$G_d^{max} = 6.$$

Figure 7:
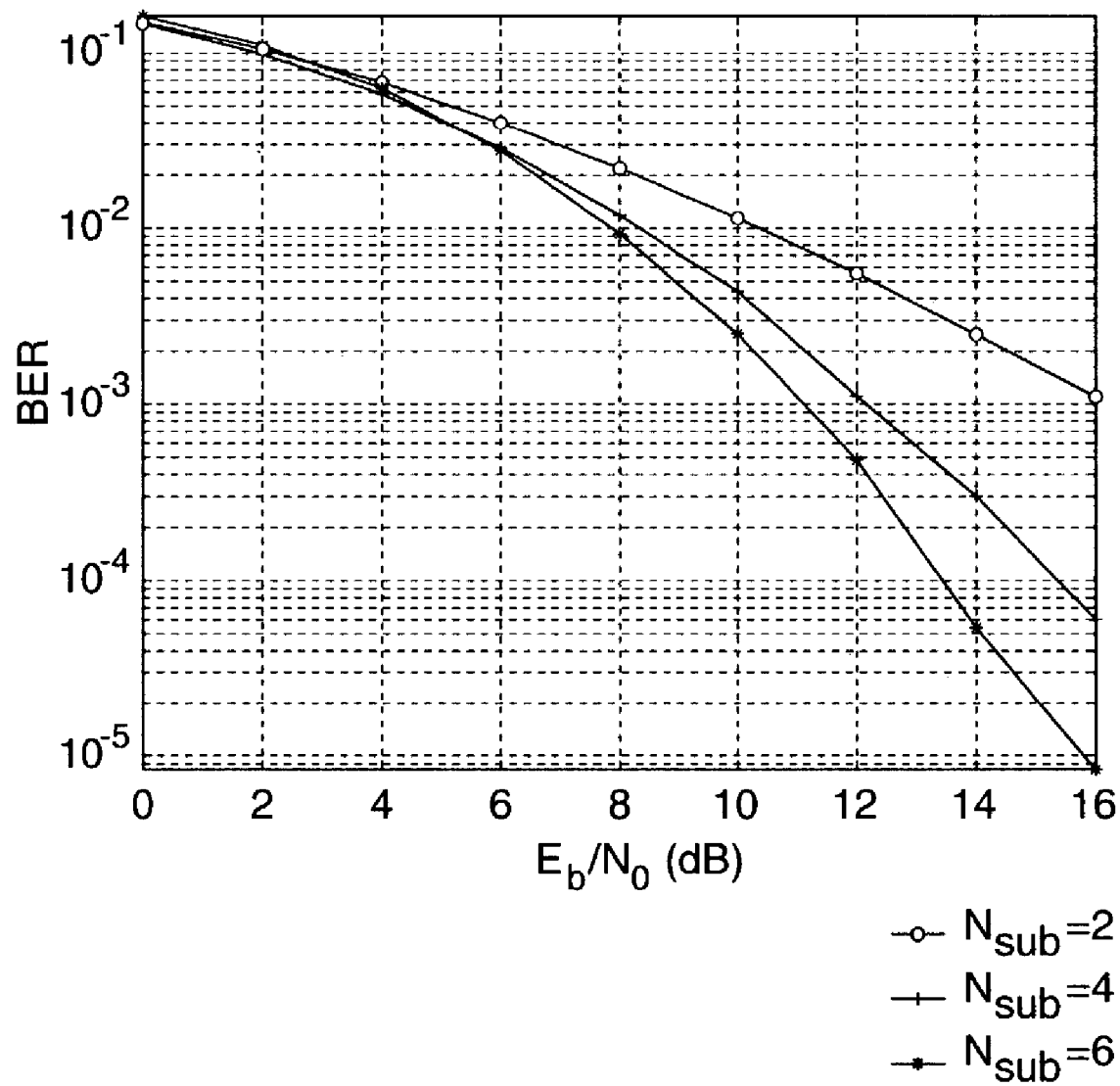

FIG. 7 confirms that as $N_{sub}$ decreases, the achieved diversity decreases. Since the channel correlation matrix $R_h$ has full rank, the achieved diversity order is $N_{sub}$.

Comparing the slopes of BER curves in FIG. 6 and FIG. 7 confirms our result. Note that decoding complexity also decreases as $N_{sub}$ decreases. This shows that when the product $N_tL$ is large, we can select $N_{sub}$ small to lower complexity.

Figure 8:
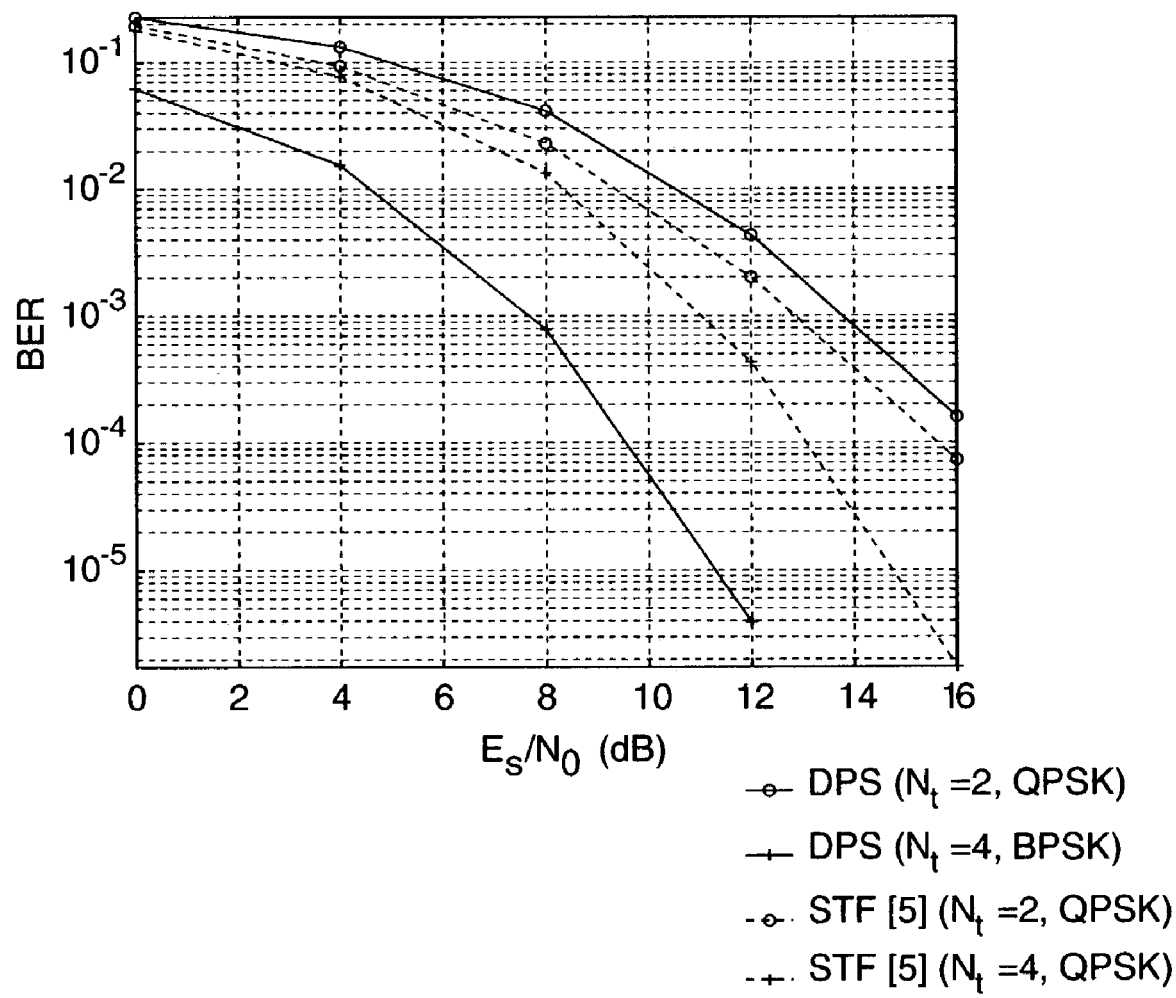

Test case 3: In this example, we set L=2, $N_r=1$, and $N_t=2,4$. The channel taps are independent and satisfy an exponentially decaying power profile. When $N_t=2$, we selected QPSK for both STM and STF. From FIG. 8, we infer that STF outperforms STM about 1 dB, while having lower computational complexity. When $N_t=4$, to maintain the same transmission rate, we selected BPSK for our STM and QPSK for STF, because STF uses the block code that has rate ½ symbols/sec/Hz. From FIG. 8, we observe that observe that our STM techniques outperforms the STF by about 3 dB.

Various embodiments of the invention have been described. The described techniques can be embodied in a variety of receivers and transmitters including base stations, cell phones, laptop computers, handheld computing devices, personal digital assistants (PDA's), and the like. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer readable instructions that when executed in a wireless communication device, cause the wireless communication device to carry out one or more of the techniques described herein. These and other embodiments are within the scope of the following claims.

The invention claimed is:

1. A wireless communication device comprising:
   a linear precoder that linearly precodes a data steam to produce a precoded data stream;
   a power splitter to produce a plurality of mirrored precoded data streams from the precoded data streams;
   a plurality of delay shift modules that, based on estimates of delay lags for each of a plurality of multi-path channels to a receiver, process the mirrored precoded data streams to shift the delay lag of each of the channels so that channel taps within the mirrored precoded data streams become consecutive; and
   a plurality of antennas to output waveforms in accordance with the mirrored preceded data streams.

2. The wireless communication device of claim 1, wherein the digital phase sweeping modules compute a single channel vector from the estimates of delay lags for each of a plurality of multi-path channels to a receiver, and process the minored preceded data steams with the single channel vector to shift the delay lag of each of the channels so that channel taps within the mirrored preceded data streams become consecutive.

3. The wireless communication device of claim 1, the linear precoder comprises a linear constellation precoder.

4. The wireless communication device of claim 1, wherein the linear precoder applies a unitary matrix to blocks of M symbols of the encoded data stream.

5. The wireless communication device of claim 1, further comprising a plurality of modulators to modulate each minored precoded data stream and produce the waveforms for transmission with the respective antennas.

6. The wireless communication device of claim 1, wherein the waveforms are multi-carrier waveforms.

7. The wireless communication device of claim 1, wherein the waveforms are single-carrier waveforms.

8. The wireless communication device of claim 1, wherein the linear precoder applies a matrix to symbol blocks of the data stream, wherein each block contains N symbols, end the matrix has a size that is an integer function of the number of antennas $N_t$ and the estimate number (L) of multi-path channels.

9. The wireless communication device of claim 8, wherein $N > N_t * L$.

10. The wireless communication device of claim 8, wherein the linear precoder divides each of the blocks of the data stream into $N_g$ groups, where each group has $N_{sub}$ symbols, and $N_{sub}$ is an integer function of the number of antennas and the estimate number of multi-path channels.

11. The wireless communication device of claim 10, wherein $N_{sub} \geq N_t * L$.

12. The wireless communication device of claim 10, wherein the matrix applied by the linear precoder has a size of $N_{sub} \times N_{sub}$.

13. The wireless communication device of claim 10, further comprising modules to apply a permutation matrix to each of the precoded data streams to permute the symbol blocks within the mirrored precoded data streams.

14. The wireless communication device of claim 13, wherein the antennas transmit a single-carrier waveform directly from the mirrored precoded data streams.

15. The wireless communication device of claim 14, wherein the wireless communication device transmits an orthogonal frequency division multiplexing waveform (OFDM) with each of the antennas directly from the mirrored precoded data streams without applying an inverse fast Fourier transform (IFFT) to each of the mirrored precoded data streams.

16. The wireless communication device of claim 15, wherein the linear precoder applies a linear constellation precoding matrix having a dimensions of N×N to each of the blocks of the data stream to form the precoded data stream, and the wireless communication device transmits the mirrored precoded data streams as single-carrier waveforms.

17. The wireless communication device of claim 1, wherein the wireless communication device comprises one of a base station and a mobile device.

18. A method comprising:
applying a linear precoder to a data stream to form a precoded data stream;
splitting the power of the precoded data stream to produce a plurality of mirrored precoded data streams;
estimating a delay lag for each of a plurality of multi-path channels from the transmitter to a receiver;
processing the mirrored precoded data streams to shift the delay lag of each of the channels so that channel taps within the mirrored precoded data streams become consecutive; and
transmitting the minored precoded data stream with respective antennas.

19. The method of claim 18, wherein processing comprises:
computing a single channel vector from the estimated delay lags for the channels; and
processing the mirrored precoded data streams with the single channel vector to shift the delay lag of each of the channels so that channel taps within the mirrored precoded data streams become consecutive.

20. The method of claim 18, wherein applying a linear precoder comprises applying a linear constellation precoder.

21. The method of claim 18, wherein transmitting the mirrored precoded data streams comprises modulating each mirrored precoded data stream to produce a set of waveforms for transmission with the respective antennas.

22. The method of claim 21, wherein the waveforms are multi-carrier waveforms.

23. The method of claim 21, wherein the waveforms are single-carrier waveforms.

24. The method of claim 18, wherein applying a linear precoder comprises:
selecting a block size N as a function of the number of antennas $N_t$, and an estimate number L of multi-path channels to a receiver; and
applying a matrix to symbol blocks of the data stream, wherein the matrix has a size that is selected as a function of the number of antennas and the estimate number of multi-path channels.

25. The method of claim 24, wherein $N > N_t * L$.

26. The method of claim 24, wherein applying a linear precoder comprises:
dividing each of the blocks of the data stream into $N_g$ groups, where each group has $N_{sub}$ symbols, and $N_{sub}$ is selected as a function of the number of antennas and the estimate number of multi-path channels; and
applying the matrix to each of the symbol groups within the blocks, wherein the matrix has a dimension that is a function of the number of symbols $N_{sub}$ within the groups.

27. The method of claim 26, wherein $N_{sub} \geq N_t * L$.

28. The method of claim 26, wherein a size of the matrix is $N_{sub} \times N_{sub}$.

29. The method of claim 24, wherein transmitting the minored precoded data streams comprises:
applying a permutation matrix to each of the preceded data streams to permute the blocks within the preceded data streams; and
transmitting a multi-carrier waveform with each of the antennas directly from the permuted precoded data streams.

30. The method of claim 29, wherein transmitting a multi-carrier waveform comprises transmitting an orthogonal frequency division multiplexing waveform (OFDM) with each of the antennas directly from the permuted precoded data streams without applying an inverse fast Fourier transform (LEFT) to each of the precoded data streams.

31. The method of claim 30, wherein applying a matrix comprises applying a matrix having a dimensions of N×N to each of the blocks of the data stream to form the precoded data stream.

32. The method of claim 18, wherein transmitting the mirrored precoded data streams comprises transmitting each of the mirrored precoded data streams as a single-carrier waveform with a respective one of the antennas.

33. A computer-readable medium comprising instructions to cause a programmable processor of a wireless communication device to:
apply a linear precoder to a data stream to form a precoded data stream;
split the power of the precoded data stream to produce a plurality of mirrored precoded data streams;
estimate a delay lag for each of a plurality of multi-path channels from the transmitter to a receiver;
compute a single channel vector from the estimated delay lags for the channels;
process the mirrored precoded data streams with the single channel vector to shift the delay lag of each of the channels so that channel tans within the mirrored precoded data streams become consecutive; and
transmit the mirrored precoded data stream with respective antennas.

34. The computer-readable medium of claim 33, further comprising instructions to cause the programmable processor to:
select a block size N as a function of the number of antennas $N_t$ and an estimate number L of multi-path channels to a receiver; and
apply a matrix to symbol blocks of the data stream, wherein the matrix has a size that is selected as a function of the number of antennas and the estimate number of multi-path channels.

35. A method comprising:
linearly encoding blocks of N symbols of a data stream with a matrix to form a precoded data stream, wherein N is an integer function of the number of antennas $N_t$ of a transmitter and an estimated number L of multi-path channels from the transmitter to a receiver; and
transmitting the precoded data stream with the antennas.

* * * * *

UNITED STATES PATENT AND TRADEMARK OFFICE
CERTIFICATE OF CORRECTION

PATENT NO. : 7,224,744 B2  Page 1 of 1
APPLICATION NO. : 10/420352
DATED : May 29, 2007
INVENTOR(S) : Georgios B. Giannakis and Xiaoli Ma It is certified that error appears in the above-identified patent and that said Letters Patent is hereby corrected as shown below:

Col. 4, Line 49, $\{h^{(\nu,\mu)}(t)\}$, should be -- $\{h^{(\nu,\mu)}(l)\}$ --

Col. 5, Line 2, $h^{(1,1)}(L), ..., h^{(1,Nt)}(L), ... h^{(Nr,Nt)}(l)$ ]T, should be -- $h^{(1,1)}(L), ... , h^{(1,Nt)}(L), ... h^{(Nr,Nt)}(l)$ ]$^T$ --

Col. 6, Line 56, common lags, should be -- common delay lags --

Col. 7, Line 16, "$h^{(\nu)}(l) = h^{(\nu,[l/(L+1)]+1)}$", should be -- $h^{(\nu)}(l) = h^{(\nu,[l/(L+1)]+1)}$ --

Col. 7, Line 45, channel tape, should be -- channel taps --

Col. 9, Line 35, $\begin{bmatrix} I_{N_R} \otimes \theta_1^T \\ \vdots \\ I_{N_R} \otimes \theta_{N_{sub}}^T \end{bmatrix}$ , should be -- $\begin{bmatrix} I_{N_R} \otimes \theta_1^T \\ \vdots \\ I_{N_R} \otimes \theta_{N_{sub}}^T \end{bmatrix}$ , --

Signed and Sealed this

Twenty-second Day of July, 2008

JON W. DUDAS
*Director of the United States Patent and Trademark Office*